United States Patent
Bhatia et al.

(10) Patent No.: US 10,498,895 B2
(45) Date of Patent: Dec. 3, 2019

(54) DYNAMIC THROTTLING AND REAL-TIME SCHEDULING OF NOTIFICATIONS USING A CAMPAIGN MANAGEMENT SYSTEM

(71) Applicant: T-Mobile USA, Inc., Bellevue, WA (US)

(72) Inventors: Abha Bhatia, Bellevue, WA (US); Poornima Magadevan, Bellevue, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

(21) Appl. No.: 16/174,132

(22) Filed: Oct. 29, 2018

(65) Prior Publication Data

US 2019/0068786 A1    Feb. 28, 2019

Related U.S. Application Data

(62) Division of application No. 15/629,624, filed on Jun. 21, 2017, now Pat. No. 10,135,984, which is a (Continued)

(51) Int. Cl.
*H04M 3/00* (2006.01)
*H04M 5/00* (2006.01)
(Continued)

(52) U.S. Cl.
CPC ...... *H04M 3/5191* (2013.01); *H04L 41/0896* (2013.01); *H04L 41/5022* (2013.01);
(Continued)

(58) Field of Classification Search
CPC ............ H04L 41/0896; H04L 41/5022; H04L 43/0817; H04L 47/805; H04M 15/00;
(Continued)

(56) References Cited

U.S. PATENT DOCUMENTS

| 8,391,466 B1* | 3/2013 | Noble, Jr. | H04M 3/5238 379/265.01 |
| 8,553,873 B1* | 10/2013 | Noble, Jr. | H04M 3/5238 379/265.01 |

(Continued)

OTHER PUBLICATIONS

Office action for U.S. Appl. No. 14/985,088, dated Nov. 16, 2016, Bhatia et al., "Dynamic Throttling and Real-Time Scheduling of Notifications Using a Campaign Management System", 8 pages.

(Continued)

*Primary Examiner* — Khai N. Nguyen
(74) *Attorney, Agent, or Firm* — Lee & Hayes, P.C.

(57) ABSTRACT

This disclosure sets forth systems and techniques that automatically allocate and throttle back resource capacity to multiple campaign events, in real-time, based on campaign event priorities and a supply and demand of available resource capacity. For example, a campaign management system may re-allocate unused resource capacity to a particular campaign event based on the particular campaign event's real-time demand for additional resource capacity. Unused resource capacity may originate from a common pool of resource capacity, or from other campaign events that have an over-allocation of resource capacity that is being underutilized. Further, the techniques described herein also describe throttling back resource capacity of a particular campaign event in response to determining that an existing pool of available resource capacity is unable to serve the particular campaign event's requirements.

20 Claims, 6 Drawing Sheets

Related U.S. Application Data division of application No. 14/985,088, filed on Dec. 30, 2015, now Pat. No. 9,706,052.

(60) Provisional application No. 62/205,515, filed on Aug. 14, 2015.

(51) Int. Cl.

| | | |
|---|---|---|
| *H04M 3/51* | (2006.01) | |
| *H04M 7/00* | (2006.01) | |
| *H04L 12/24* | (2006.01) | |
| *H04L 12/927* | (2013.01) | |
| *H04W 4/08* | (2009.01) | |
| *H04W 4/12* | (2009.01) | |
| *H04M 15/00* | (2006.01) | |
| *H04W 4/24* | (2018.01) | |
| *H04L 12/26* | (2006.01) | |
| *H04W 4/06* | (2009.01) | |
| *H04M 3/42* | (2006.01) | |

(52) U.S. Cl.
CPC ........ *H04L 43/0817* (2013.01); *H04L 47/805* (2013.01); *H04M 3/5158* (2013.01); *H04M 3/5175* (2013.01); *H04M 7/0084* (2013.01); *H04M 15/00* (2013.01); *H04M 15/8027* (2013.01); *H04W 4/06* (2013.01); *H04W 4/08* (2013.01); *H04W 4/12* (2013.01); *H04W 4/24* (2013.01); *H04M 3/42382* (2013.01); *H04M 2215/7428* (2013.01)

(58) Field of Classification Search
CPC ..... H04M 15/8027; H04M 2215/7428; H04M 3/42382; H04M 3/5158; H04M 3/5175; H04M 3/5191; H04M 7/0084; H04W 4/06; H04W 4/08; H04W 4/12; H04W 4/24

USPC ............ 379/210.01, 265.01, 265.02, 265.03, 379/265.04, 265.05, 265.06, 265.07, 379/265.08, 265.09, 265.1, 265.11, 379/265.12, 265.13, 265.14, 266.01, 379/266.02, 266.03, 266.04, 266.05, 379/266.06, 266.07, 266.08, 266.09, 379/266.1

See application file for complete search history.

(56) References Cited

U.S. PATENT DOCUMENTS

| | | | | |
|---|---|---|---|---|
| 8,935,172 | B1 * | 1/2015 | Noble, Jr. | G06Q 10/06 705/7.12 |
| 8,949,840 | B1 * | 2/2015 | Pulford | G06F 9/4887 718/103 |
| 8,965,779 | B1 * | 2/2015 | Noble, Jr. | G06Q 10/06 705/7.12 |
| 9,372,730 | B1 * | 6/2016 | Pulford | G06F 9/4887 |
| 9,706,052 | B2 * | 7/2017 | Bhatia | H04M 3/5191 |
| 10,135,984 | B2 * | 11/2018 | Bhatia | H04M 3/5191 |
| 2009/0180606 | A1 * | 7/2009 | Omiya | G06Q 10/04 379/265.05 |
| 2010/0215169 | A1 * | 8/2010 | Ristock | H04L 41/5061 379/221.15 |
| 2013/0343536 | A1 * | 12/2013 | Dey | G06Q 30/0202 379/266.08 |
| 2017/0048390 | A1 * | 2/2017 | Bhatia | H04M 3/5191 |
| 2017/0289353 | A1 * | 10/2017 | Bhatia | H04M 3/5191 |
| 2019/0068786 | A1 * | 2/2019 | Bhatia | H04M 3/5191 |

OTHER PUBLICATIONS

Office Action for U.S. Appl. No. 15/629,624, dated Mar. 8, 2018, Bhatia et al., "Dynamic Throttling and Real-Time Scheduling of Notifications Using a Campaign Management System", 13 pages.

* cited by examiner

DYNAMIC THROTTLING AND REAL-TIME SCHEDULING OF NOTIFICATIONS USING A CAMPAIGN MANAGEMENT SYSTEM

CROSS-REFERENCE TO RELATED APPLICATION

This patent application is a divisional application of commonly owned U.S. patent application Ser. No. 15/629,624, filed on Jun. 21, 2017, now known as U.S. Pat. No. 10,135,984, issued on Nov. 20, 2018, which is a divisional application of commonly owned U.S. patent application Ser. No. 14/985,088, filed Dec. 30, 2015, now known as U.S. Pat. No. 9,706,052, issued on Jul. 11, 2017, which claims priority to U.S. Provisional Patent Application No. 62/205,515 filed on Aug. 14, 2015, and titled "Dynamic Throttling and Real-Time Scheduling of Notifications with an SMS Aggregator". Application Ser. Nos. 15/629,624, 14/985,088 and 62/205,515 are fully incorporated herein by reference.

BACKGROUND

Traditionally, system administrators allocate resource capacity in discrete blocks to particular campaign events, on a campaign event-by-campaign event basis. System administrators may allocate resource capacity based on historical trends, or an expectation of demand. However, at times, it may be difficult to determine the exact resource requirements of a campaign event. In these instances, campaign events may be over-allocated resource capacity that is ultimately left underutilized. Further, system administrators may under-resource particular campaign events, and may be forced to obtain additional capacity expansion licensing fees to ensure that sufficient resource capacity is available to support the campaign event.

Thus, system administrators may simultaneously manage some campaign events with an over-allocated resource capacity that is left underutilized, and other campaign events with an under-allocated resource capacity that ultimately requires additional expansion licensing fees to ensure sufficient resource capacity is made available.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
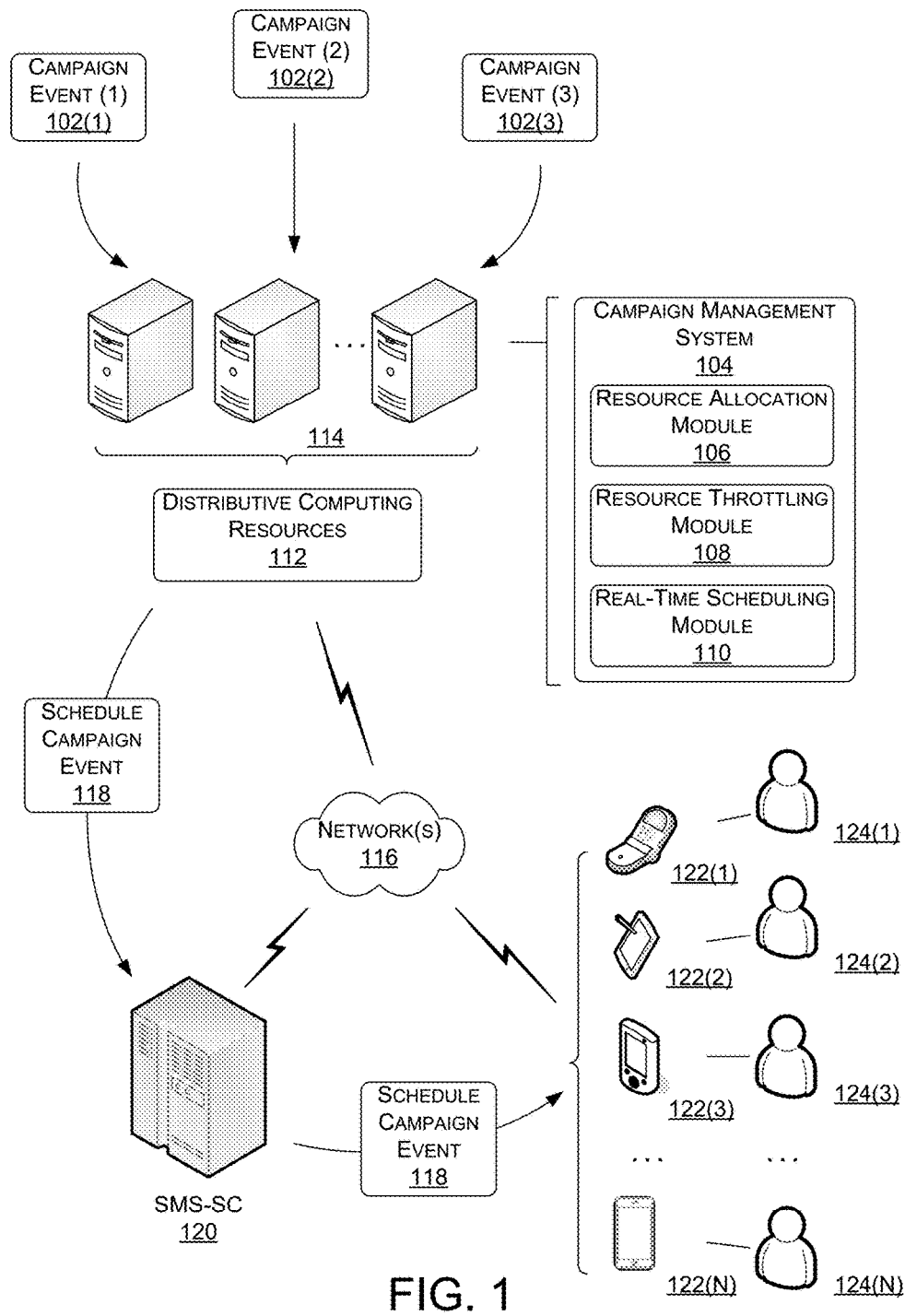
FIG. 1 illustrates a schematic view of a computing environment to dynamically allocate available resource capacity to multiple campaign events.

This disclosure sets forth systems and techniques that automatically allocate resource capacity to multiple campaigns, in real-time, based on campaign event priorities and a supply and demand of available resource capacity. The term, "campaign," as used herein describes a task of delivering a particular set of notifications to a group of individuals. A campaign event may correspond to a delivery of short-message-service (SMS) notifications to a group of consumers of a particular vendor. In another example, a campaign event may correspond to a delivery Voice-Over-Internet-Protocol (VOIP) messages to a group of consumers. Further, individual campaigns may focus on different fields of interest. In a non-limiting example, individual campaigns may focus marketing, care services, billing, provisioning, and consumer feedback.

A campaign management system may allocate resource capacity based on a number of different criteria, such as historical trends, service level agreements (SLAs), assigned priority scores, and real-time demand for resource capacity. For example, historical trends may indicate that particular campaigns target a large group of consumers and tend to solicit high response rates. Since, high response rates tend to require additional resource capacity to deliver follow-up notifications, the campaign management system may allocate a high level of resource capacity to these campaigns based on historical trends. In another example, an SLA may obligate the campaign management system to allocate a minimum resource capacity to a particular campaign event based on a relative difficulty (i.e. resource intensiveness) of the computational task. Further, a priority score may be used to prioritize an allocation of resource capacity to a particular campaign event, or group of campaign events, based on criteria such as an importance of notifications to the consumer or sender. In some examples, an SLA may further help define a priority score of the campaign, or other predetermined design constraints that the campaign management system is obligated to follow. For example, an SLA that defines a minimum allocation of resource capacity may be assigned a higher priority score in comparison to another campaign event that is not subject to an SLA. In a third example, resource capacity may be allocated to campaign events based on real-time demand, as discussed in more detail below.

The techniques described herein allow the campaign management system to re-allocate unused resource capacity to a particular campaign event based on a particular campaign's real-time demand for additional resource capacity. Unused resource capacity may originate from a common pool of resource capacity, or from other campaigns that have an over-allocation of resource capacity that is being under-utilized. Consider the following example of a campaign management system that handles a first campaign event and a second campaign event. The first campaign event may transmit informational messages to a small group of consumers, and the informational messages may not solicit a consumer response. However, a second campaign event may send marketing notifications to a larger group of consumers that solicit a response from the group of consumers to accept a particular offer. Here, the second campaign event may require a higher allocation of resource capacity to deal with at least one of the larger group of consumers or the additional notifications that may follow a consumer response. Thus, in the above example, unused resource that is associated with the first campaign event may be re-allocated to the second campaign. Alternatively, or additionally, unused resource capacity from a common pool of resource capacity may be allocated to the second campaign event based on its demand.

Different campaigns may also be assigned different priority scores, and the allocation of available resource capacity may be based at least in part on the assigned priority scores. For example, a billing campaign event may be assigned a higher priority score than a marketing campaign event. Thus, if a billing campaign event and a marketing campaign event both require additional resource capacity, the campaign management system may allocate the billing campaign event a first allocation of additional resource capacity based on its higher priority score.

In some examples, resource capacity may be measured by the computation time required to transmit the set of notifications. For example, resource capacity may be determined by the computing resources required to deliver a particular number of SMS messages per second. In other examples, resource capacity may be determined by a fixed allocation of computing resources, such as a fixed number of services, computation time, computation cost, or other measure amount of computing services.

The techniques described herein also describe throttling back resource capacity of a particular campaign event in response to determining that an existing pool of available resource capacity is unable to serve the particular campaign's requirements. For example, consider a particular campaign event that transmits notifications that solicit customers to call back and request additional information. The campaign management system may determine that a particular percentage of notifications can result in a call back, and in this instance a problem may occur if the campaign event transmits a total number of notifications that results in a number of call backs that exceed a call-back volume capacity. As a non-limiting example, consider a campaign event that solicits a response from customers, and which can accommodate a maximum call-back volume of 50 customers within a given time period. If a notification-to-call back percentage is 20%, then the maximum number of notifications that may be sent out is 250, because if 20% of 250 customers call back, then the maximum call-back volume capacity, within the given time period, has been reached. In this example, the resource capacity, measured as the number of SMS messages sent per second, may be throttled back to accommodate the maximum call-back volume of 50 customers within a given time period. In other words, the campaign management system ensures that resource capacity is throttled back to reflect vendor capabilities.

In various examples, throttling back resource capacity of a particular campaign event may also occur in response to determining that the resource capacity currently assigned to the particular campaign event is needed to support another campaign event, with a high priority score. In a non-limiting example, a billing campaign event may be assigned a higher priority score to a marketing campaign event. The resource capacity assigned to the marketing campaign event may be throttled back to support the billing campaign event in the event that the billing campaign event requires additional resource capacity that cannot be sourced from a general pool of resource capacity, or a reserve pool of resource capacity.

Real-time scheduling and throttling of resource capacity delivers a technical benefit of efficiently re-allocating resource capacity between multiple campaigns. In some cases, unused capacity may be re-allocated from campaigns with an underutilized resource capacity, to campaigns that are in demand for additional resource capacity. In other cases, resource capacity may be throttled back to reflect vendor capabilities. In both instances, a plurality of campaigns may be supported without having to over-allocate resource capacity to discrete campaigns to the detriment of other campaigns that unexpectedly require additional resource capacity.

Further, real-time scheduling of resource capacity delivers an economical benefit to an operator by limiting expenditure on capacity expansion licensing fees. Traditionally, if a campaign requires additional resource capacity, an expansion licensing fee is required to provide the additional resource capacity to the campaign. However, the techniques described herein may avoid a need to purchase capacity expansion licensing fees on a campaign-by-campaign basis, by re-allocating unused capacity from underutilized campaigns to other campaigns in demand for additional resource capacity.

The term "techniques," for instance, may refer to system(s), method(s), computer-readable instructions, module(s), algorithms, hardware logic, and/or operation(s) as permitted by the context described above and throughout the document.

FIG. 1 illustrates a schematic view of a computing environment that dynamically allocates available resource capacity to one or more campaign event(s) 102. In the illustrated example, one or more campaign event(s) 102 may be submitted to a Campaign Management System 104. The one or more campaign event(s) 102 may correspond to a delivery of short-message-service (SMS) notifications to a group of users. The SMS notifications may be associated with a particular vendor, and relate to particular fields of interest, such as marketing, care services, billing, provisioning, and consumer feedback. In some examples, the campaign events may provide informational notifications to the group of users, without soliciting a user response. In other examples, the one or more campaign event(s) 102 may solicit a response from the group of users.

In the illustrated example, the campaign management system 104 may include a resource allocation module 106, a resource throttling module 108, and a real-time scheduling module 110. The resource allocation module 106 may allocate resource capacity to one or more campaign events 102. Resource capacity may be allocated based on one or more criteria, including historical trends, service level agreements (SLAs), and assigned priority scores. For example, a campaign event that historically required a particular resource capacity may be assigned that same resource capacity. The resource throttling module 108 may reduce resource capacity that is assigned to a particular campaign event in response to determining that an existing pool of available resource capacity is unable to service the campaign event. Additionally, or alternatively, the resource throttling module 108 may adjust an assigned resource capacity of a campaign event in the event that the assigned resource capacity is needed to support another campaign event with a higher priority score. Further, the real-time scheduling module 106 may monitor and audit progress of the one or more campaign event(s) 102, and adjust an allocation of resource capacity based on a real-time demand. For example, if a particular campaign event is receiving a number of responses from users that is above expectation, additional resource capacity may be assigned to support follow-up notifications. In other examples, the campaign management system 102 may alter a schedule for implementing a particular campaign event based on a determination that insufficient resource capacity is available at scheduled time, or that the available resource capacity is committed to other campaign events with a high priority score.

In the illustrated example, the campaign management system 102 may operate on one or more distributive computing resources 112. The distributive computing resources 112 may include one or more computer device(s) 114 that operate in a cluster or other configuration to share resources, balance load, increase performance, provide fail-over support or redundancy, or for other purposes.

In various examples, the one or more computing device(s) 114 may include one or more interfaces that enable communications with other networked devices, such as an SMS-SC, client device(s) via one or more network(s) 116. The one or more network(s) 116 may include public networks such as the Internet, private networks such as an institutional and/or personal intranet, or some combination of private and public networks. The one or more network(s) 116 may also include any type of wired and/or wireless network, including but not limited to local area network (LANs), wide area networks (WANs), satellite networks, cable networks, Wi-Fi networks, WiMax networks, mobile communications networks (e.g., 3G, 4G, and so forth) or any combination thereof. The one or more network(s) 116 can utilize communications protocols, including packet-based and/or datagram-based protocols such as internet protocol (IP), transmission control protocol (TCP), user datagram protocol (UDP), or other types of protocols. Moreover, the one or more network(s) 116 can also include a number of devices that facilitate network communications and/or form a hardware basis for the networks, such as switches, routers, gateways, access points, firewalls, base stations, repeaters, backbone devices, and the like. In some examples, the one or more network(s) 116 can further include devices that enable connection to a wireless network, such as a wireless access point (WAP). Example examples support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), and other standards.

In the illustrated example, the campaign management system 104 may submit a scheduled campaign event 118 to a Short Message Service—Service Center (SMS-SC) 120 for distribution to a group of users. The SMS-SC 120 may comprise of a network element that stores, forwards, converts, and delivers SMS messages to the group of users. In the illustrated example, the scheduled campaign event 118 may correspond to a delivery of SMS messages to the SMS-SC 120. In other examples, the campaign event may correspond to a delivery of messages other than SMS notifications, such as VOIP messages. In these examples, a network element that is functionally equivalent to the SMS-SC 120 may store, forward, convert, and deliver VOIP messages. Thus, the function of the SMS-SC 120 in delivering SMS messages to a group of users, may be performed by an equivalent network element that delivers other types of messages, such as VOIP messages, to the group of users.

In the illustrated example, the SMS-SC 120 may transmit the scheduled campaign event to one or more client device(s) 122 that are associated with one or more user(s) 124 of a user group. In various examples, the client device(s) 122 may belong to variety of categories or classes of devices, such as traditional server-type devices, desktop computer-type devices, mobile-type devices, special purpose-type devices, embedded-type devices, wearable-type devices, implanted computing devices, personal computers, automotive computers, network-enabled televisions, thin clients, terminals, game consoles, gaming devices, work stations, media players, personal video recorders (PVRs), set-top boxes, cameras, integrated components for inclusion in a computing device, appliances, or any other sort of computing device configured to receive user input. Thus, client device(s) 122 can include a diverse variety of device types and are not limited to a particular type of device.

Figure 2:
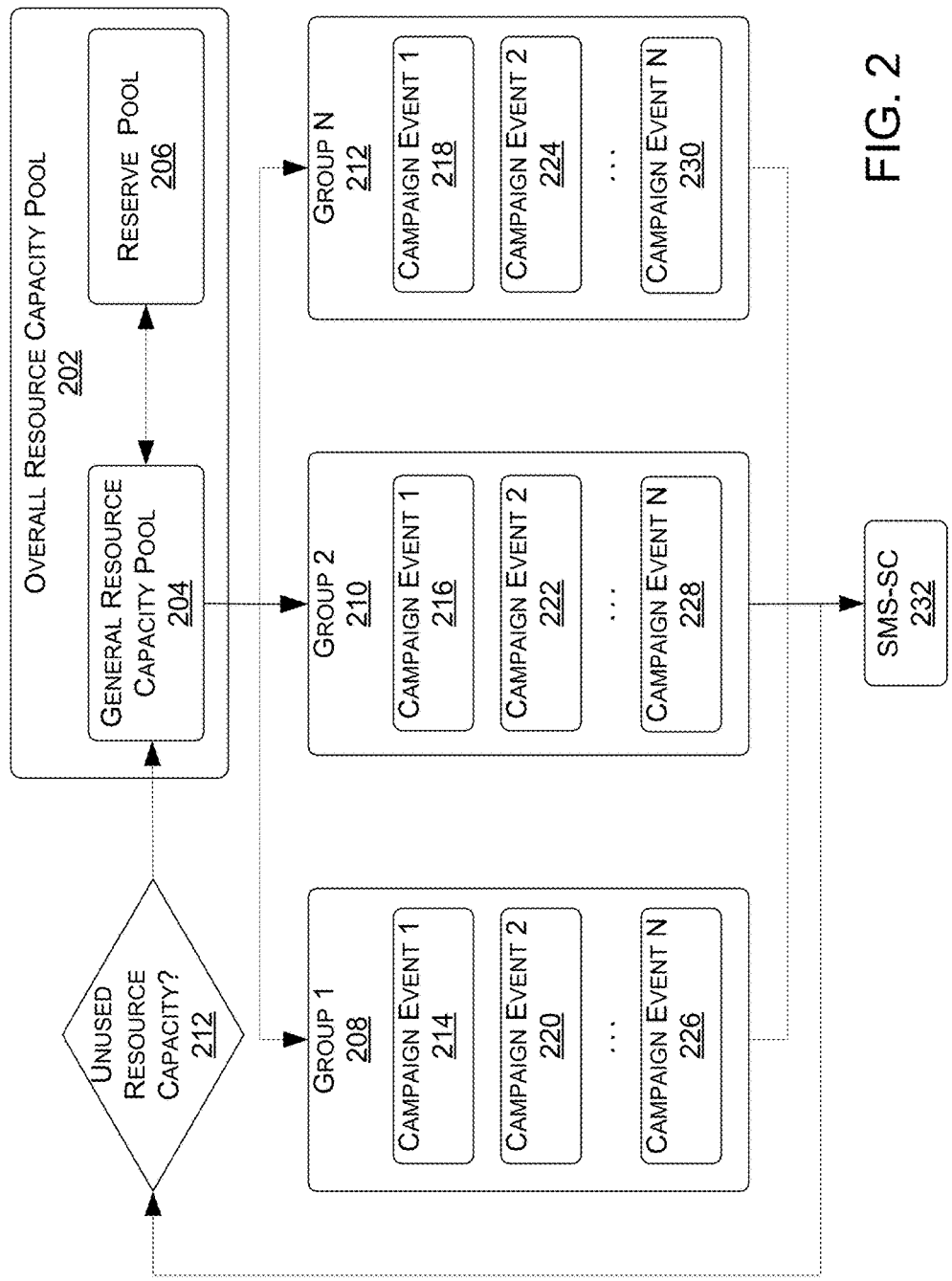
FIG. 2 illustrates a schematic view of a resource capacity pool that provides flexible allotments of resource capacity through individual pipelines to different groups and campaign events, for dynamic scheduling.

FIG. 2 illustrates a schematic view of a resource capacity pool that provides flexible allotments of resource capacity through individual pipelines to different groups and campaign events, for dynamic scheduling. The resource capacity may be measured by the computation time required to transmit the set of notifications. For example, resource capacity may be determined by the computing resources required to deliver a particular number of SMS messages per second. In other examples, resource capacity may be determined by a fixed allocation of computing resources, such as a fixed number of services, computation time, computation cost, or other measure amount of computing services.

In the illustrated example, the campaign management system may control an overall resource capacity pool 202 that includes a general resource pool 204 and a reserve pool 206. The general resource pool 204 may channel resource capacity through individual pipelines to one or more groups, described in FIG. 2 as group one 208, group two 210, and group N 212. Although only three groups are illustrated in FIG. 2, any number of groups may be included as part of the campaign management system. Each of group one 208, group two 210, and group three 212 may include one or more campaign events. The campaign events may be described as campaign event one 214, 216, and 218, campaign event two 220, 222, and 224, and through to campaign event N 226, 228, and 230. The term "group," as used herein, describes a grouping of campaign events that can be functionally related to one another, or related by a common category, or a common service type. In a non-limiting example, group one 208, group two 210, and group N 212, may be functionally segregated based on a timing of when notifications must be sent. Group one 208 may include notifications that are to be sent out immediately or in a near-future, while group two 210 may include notifications that may be sent within a week, or other predetermined time interval. In another non-limiting example, group one 208, group two 210, and group N 212 may be segregated based on a common category. For example, group one 208 may include one or more campaign events with a particular priority score, while group two 210 and group N 212 may include campaign events with progressively lesser priority scores. Further, group one 208, group two 210, and group N 212, may be segregated based on a common service type. In this example, group one 208 may include one or more campaign events associated with a billing and provision system, and group two 210 may include campaign events related to a marketing and offering system. Other common service types may include customer CARE provisioning, technical service provisioning, or customer feedback services.

In various examples, the resource allocation module may allocate resource capacity to the individual groups based on a group level priority score, real-time demand for resource capacity, or a historical tend of resource capacity utilization. Further, the resource allocation module may distribute resource capacity that is allocated to a particular group to individual campaign events within the particular group. Here, an allocation of resource capacity to individual campaign events may be based on a campaign event level priority score, a real-time demand for resource capacity, or a historical trend of resource capacity utilization. In other examples, an allocation of resource capacity to a group or campaign event may be further based at least in part on an SLA, which is discussed in more detail below.

Further, at block 212, the campaign management system may monitor and audit the resource capacity allotted to group one 208, group 210, and group N 212, to determine whether unused resource capacity can be reassigned to the general resource capacity pool 204 or to a reserve pool 206. In doing so, this allows the campaign management system to re-allocate the unused resource capacity to other groups or campaign events that require additional resource capacity. The monitoring and auditing of the resource capacity is described in more detail below, with reference to the scheduling module of the campaign management system.

In the illustrated example, the campaign management system may include a reserve pool 206 of resource capacity. The reserve pool 206 may comprise of a predetermined percentage of the overall resource pool capacity 202. In some examples, the reserve pool 206 may be a percentage of the overall resource capacity that remains unused. In other examples, the reserve pool 206 may be utilized in cases where dynamic throttling of particular campaign events may be required.

Figure 3:
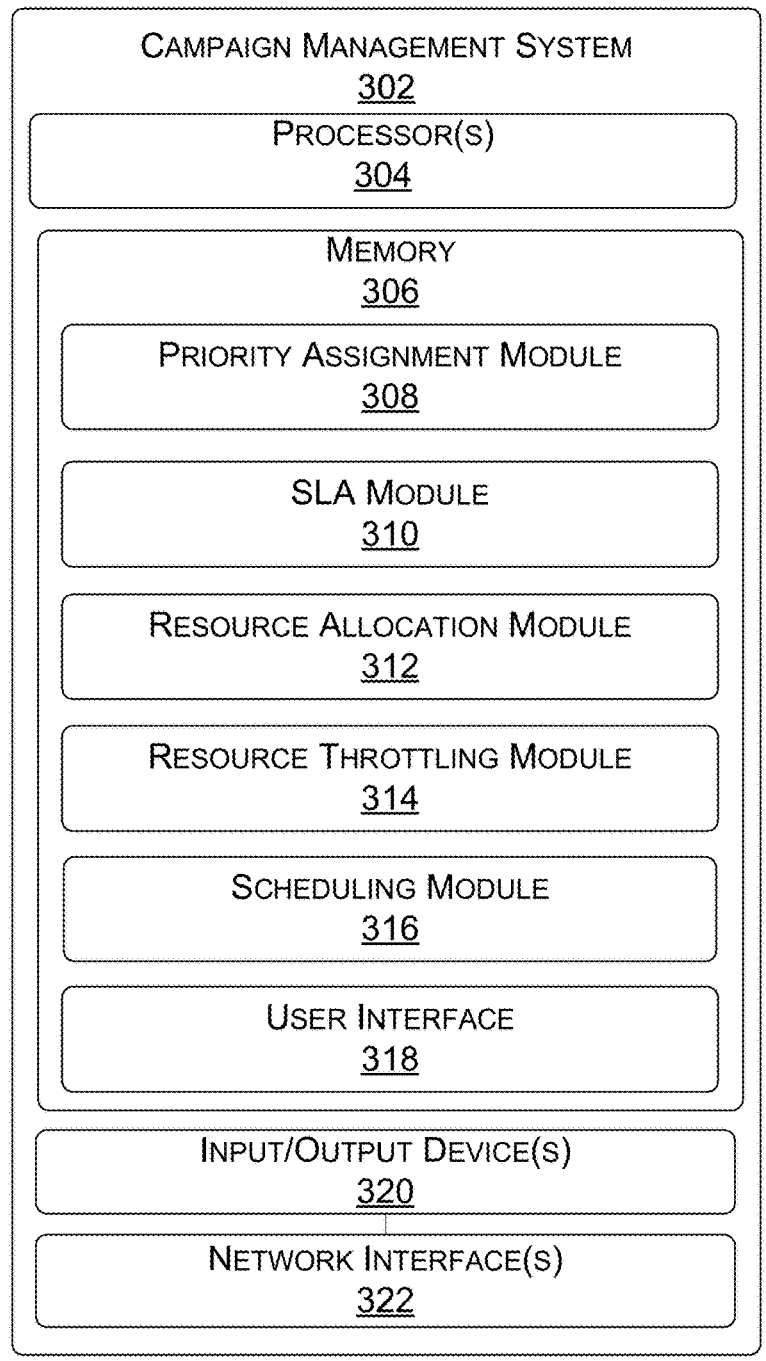
FIG. 3 illustrates a block diagram of a campaign management system that is capable of dynamically allocating available resource capacity to support multiple campaign event.

FIG. 3 illustrates a block diagram of a campaign management system 302 that is capable of dynamically allocating available resource capacity to support one or more campaign event(s). In the illustrated example, the campaign management system 302 may include one or more processor(s) 304 operable connected to memory 306. In at least one example, the one or more processor(s) 304 may be central processing unit(s) (CPU), graphics processing unit(s) (GPU), a both a CPU and GPU, or any other sort of processing unit(s). Each of the one or more processors(s) 304 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution. The one or more processor(s) 304 may also be responsible for executing all computer applications stored in the memory, which can be associated with common types of volatile (RAM) and/or nonvolatile (ROM) memory.

In some examples, memory 306 may include system memory, which may be volatile (such as RAM), non-volatile (such as ROM, flash memory, etc.) or some combination of the two. The memory may also include additional data storage devices (removable ad/or non-removable) such as, for example, magnetic disks, optical disks, or tape.

The memory 306 may further include non-transitory computer-readable media, such as volatile and nonvolatile, removable and non-removable media implemented in any method or technology for storage of information, such as computer readable instructions, data structures, program modules, or other data. System memory, removable storage and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information.

In the illustrated example, the memory 306 may include a priority assignment module 308, an SLA module 310, resource allocation module 312, a resource throttling module 314, a scheduling module 316, and a user interface 318. The priority assignment module 308 may assign a priority score to particular groups and/or particular campaign events. The priority score may be used to prioritize an allocation of resource capacity to particular campaign events. In other words, an assigned priority score can distinguish an importance of notifications associated with a particular campaign event over other notifications associated with other campaign events. For example, a billing campaign event may be assigned a higher priority score than a marketing campaign event. Thus, if a billing campaign event and a marketing campaign event both require additional resource capacity, the campaign management system may allocate the billing campaign event a first allocation of additional resource capacity based on its higher priority score.

In another non-limiting example, the priority assignment module 308 may assign priority scores at a group level to reflect an importance of a collection of one or more campaign events. For example, a priority score of a billing and provisioning system group may be higher than another priority score associated with a marketing and offering system group. Further, in cases where different groups reflect a different timing of when campaign events can be implemented, the priority assignment module 308 may assign higher priority scores to campaign events that need to be implemented immediately, or in the near-term, over other campaign events that can be scheduled within a week or other predetermined time interval.

In the illustrated example, the SLA module 310 may include service level agreements that obligate the campaign management system to allocate a minimum resource capacity to a particular campaign event or a particular group. In some examples, an SLA may further define a priority of a particular group or a particular campaign event, or other predetermined design constraints that the campaign management system is obligated to follow. In a non-limiting example, the campaign management system may monitor and audit resource capacity associated with a group or campaign event that is subject to an SLA. Even though the campaign management system may identify an under-utilization of resource capacity, the campaign management system is obligated to adhere to the minimum resource capacity outlined in the SLA.

In the illustrated example, the resource allocation module 312 may allocate resource capacity to one or more groups, and/or one or more campaign events. The allocation of resource capacity may be based on one or more criteria, including historical trends, assigned priority scores, and service level agreements (SLAs). For example, a campaign event that historically required a particular resource capacity may be assigned that same resource capacity. Additionally, an allocation of resource capacity may be based on a priority score associated with a particular campaign event. Further, there may be a business reason for a particular allocation of resource capacity. For example, a particular group, or campaign event may have an SLA that requires a minimum fixed capacity. In this example, irrespective of an under-utilization of resource capacity, the particular group or campaign event may be guaranteed the minimum fixed resource capacity, as outlined by the SLA.

In the illustrated example, the resource throttling module 314 may throttle back, in other words reduce, an allocation of resource capacity assigned to a particular campaign event, or a group of campaign events. An allocation of resource capacity may be throttled back in response to determining that a vendor's call-back volume capabilities are unable to service a response rate associated with a particular campaign event, or a group of campaign events. In a non-limiting example, a particular campaign event may transmit notifications that solicit customers to call back and request additional information. The resource capacity allocated to the particular campaign event may be throttled back if it is determined that the number of expected call backs exceed a vendor's call-back volume capabilities.

Further, an allocation of resource capacity for a campaign event, or a group of campaign events, may be throttled back so that at least a portion of the resource capacity can be re-assigned to another campaign event, or group of campaign events, that have assigned a higher priority score. In a non-limiting example, an allocation of resource capacity to a marketing campaign event may be throttled back so that at least a portion of the resource capacity can be re-assigned to a billing campaign event that as a higher priority score. In doing so, the resource throttling module 314 can ensure that the available resource capacity can be used to service campaign events with the highest priority.

In the illustrated example, the scheduling module 316 may monitor and audit an implementation of one or more campaign events to determine any kind of over-allocation or underutilization of resource capacity. Thus, the scheduling module 316 may cause resource capacity that is over-allocated or underutilized to be re-allocated to another campaign event within a particular group, to another campaign event within a different group, to the general resource capacity pool, or to the reserve pool.

In various examples, the scheduling module 316 may further cause a schedule shift to delay or bring forward an implementation of a particular campaign event. A schedule shift may help offset an implementation of a particular campaign event, in order to free resource capacity that can be used to implement another campaign event with a higher priority score.

In some examples, the scheduling module 316 may also identify particular campaign events with low priority scores that may be subject to a throttling back of resource capacity, in the event that additional resource capacity is required to support a campaign event with a higher priority score. Further, in addition to identifying particular campaign events with low priority scores, the scheduling module 316 may cause resource capacity of those particular campaign events to be throttled back, based on a need to re-allocate the resource capacity to another campaign event with a high priority, or to reduce the number of notifications being sent out in order to better reflect call-back volume capabilities.

Further, the scheduling module 316 may generate resource capacity reports at a predetermined time interval. In some examples, the resource capacity reports may provide operators with an overview of current resource capacity utilization, as well as near-term projected resource capacity utilization. Further, resource capacity reports may identify potential shortages in resource capacity. In some examples, the resource capacity reports may outline schedule shifts and dynamic re-allocations of resource capacity that have already been implemented, or are currently scheduled, by the campaign management system.

In some examples, the resource capacity reports may also generate an alert that requests an operator action to resolve potential shortages in resource capacity. For example, an alert may be associated with a request to re-allocate resource capacity from a reserve pool to a particular group or a particular campaign event. Alternatively, or additionally, an alert may be associated with a request to procure an expansion licensing fee that separately sources additional resource capacity.

In the illustrated example, the user interface 318 may provide an operator with selectable options to modify implementation characteristics of the campaign management system. For example, the user interface 318 may enable an operator to assign priority scores to particular groups and particular campaign events. An operator may be able to update monitoring and auditing parameters, such as when an alert associated with potential shortages in resource capacity should be sent. The user interface 318 may also enable an operator to configure a schedule to receive and view resource capacity reports. In some examples, the user interface 318 may also enable an operator to manually allocate resource capacity to particular groups and/or particular campaign events. Further, the user interface 318 may enable the operator to upload an SLA or modify an existing SLA associated with a particular group or a particular campaign event.

In the illustrated example, the input/output device(s) 320 may include any type of output devices known in the art, such as a display (e.g. a liquid crystal display), speakers, a vibrating mechanism, or a tactile feedback mechanism. Input/output devices also include ports for one or more peripheral devices, such as headphones, peripheral speakers, or a peripheral display. Further, the input/output devices module includes any type of input devices known in the art. For example, input/output device(s) 320 may include a camera, a microphone, a keyboard/keypad, or a touch-sensitive display. A keyboard/keypad may be a push button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

In the illustrated example, the network interface(s) 322 may include any sort of transceiver known in the art. For example, the network interface(s) 322 may include a radio transceiver that performs the function of transmitting and receiving radio frequency communications via an antenna. The network interface(s) 322 may facilitate wireless connectivity between the mobile device and other electronic devices through a telecommunication network, such as a remote telecommunication server. In addition, the network interface(s) 322 may also include a wireless communication transceiver and a near field antenna for communicating over unlicensed wireless Internet Protocol (IP) networks, such as local wireless data networks and personal area networks (e.g. Bluetooth or near field communication (NFC) networks). Further, the network interface(s) 322 may include wired communication components, such as an Ethernet port or a Universal Serial Bus (USB).

Figure 4:
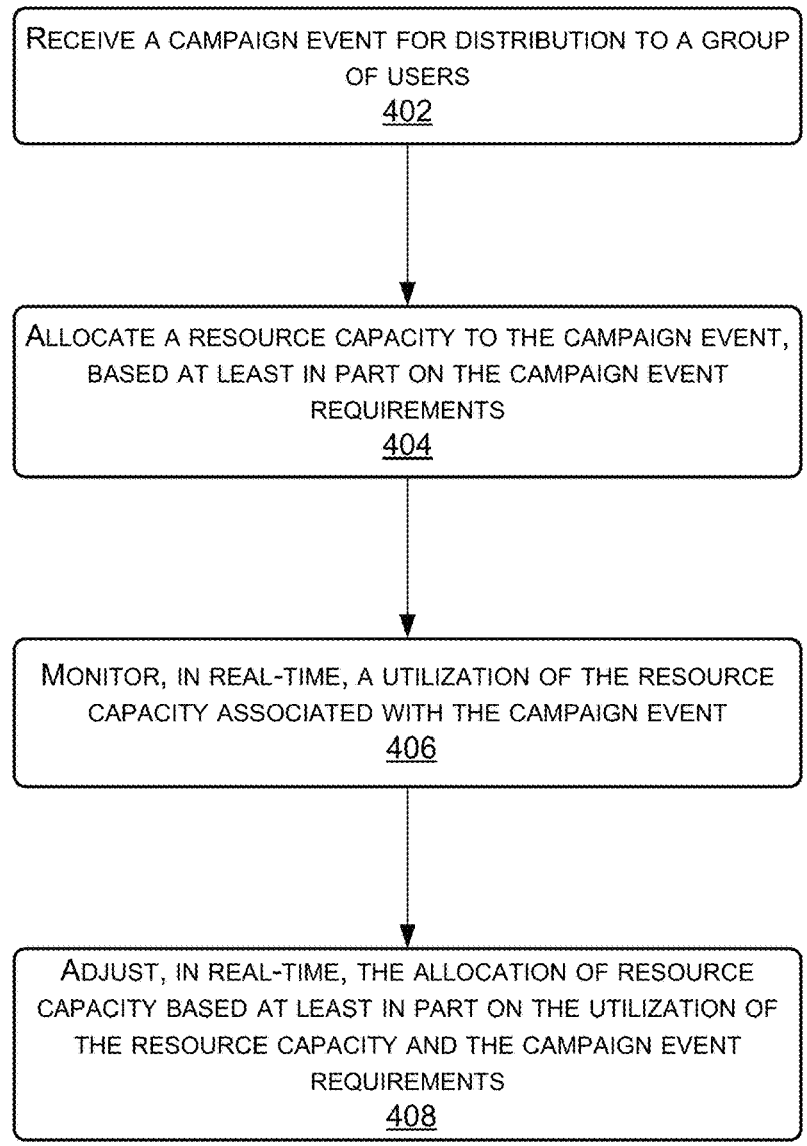
FIG. 4 illustrates a flow diagram of a process that monitors a campaign event and dynamically re-allocate resource capacity based on a utilization the allotted resource capacity.

FIG. 4 illustrates a flow diagram of a process that monitors a campaign event and dynamically re-allocates resource capacity based on a utilization the allotted resource capacity. In various examples, the campaign management system may allocate an initial resource capacity to a campaign event based on historical trends or an expectation of demand.

However, at times, the allocation of the initial resource capacity may be an over-allocation that is left underutilized. Thus, monitoring the allotment of resource capacity ensures that available resource capacity is properly apportioned to campaign events, based on actual demand At 402, the campaign management system may receive a campaign event for distribution to a plurality of users. In some examples, the campaign event may include a distribution of notifications that solicits a response from a group of users. In other examples, the notifications may comprise of informational messages that do not solicit a response from users. The campaign events may relate to a plurality of different fields of interest including, marketing services, care services, billing, provisioning, and consumer feedback.

At 404, the campaign management system may allocate a resource capacity to the campaign event, based at least in part on the campaign event requirements. In various examples, the allocation of resource capacity may be based on a number of different criteria. For example, the campaign event may target a large group of consumers, and may be required to send out the notifications immediately, or in a near-immediate future. Further, an allocation of resource capacity may be based on an expectation of consumer response rates that follow the initial notification. In some examples, campaign events that receive high response rates may require additional resource capacity to deliver follow-up notifications, further impacting an allocation of resource capacity.

At 406, the campaign management system may monitor, in real-time, a utilization of the resource capacity associated with the campaign event. In some examples, the campaign management system may monitor whether a consumer response rate is within expectations. In cases, where consumer responses are low, the resource capacity may be over-allocated and left underutilized. In other examples, if the consumer response rate exceeds expectations, the campaign management system may identify a need to allocate additional resource capacity.

At 408, the campaign management system may adjust, in real-time, the allocation of resource capacity based at least in part on the utilization of the resource capacity and the campaign event requirements. In a non-limiting example, the campaign management system may determine that a campaign event has an over-allocation of resource capacity that is left underutilized. In this example, the campaign management system may re-allocate the unused resource capacity to the general resource capacity pool or to a reserve pool. In another non-limiting example, the campaign management may re-allocate additional resource capacity to the campaign if it is determined that additional resource capacity is required. The additional resource capacity may be sourced from the general resource capacity pool, or the reserve pool. The additional resource capacity may also be sourced from another campaign event or group of campaign events, that have a determined over-allocation of resource capacity that is left underutilized.

Figure 5:
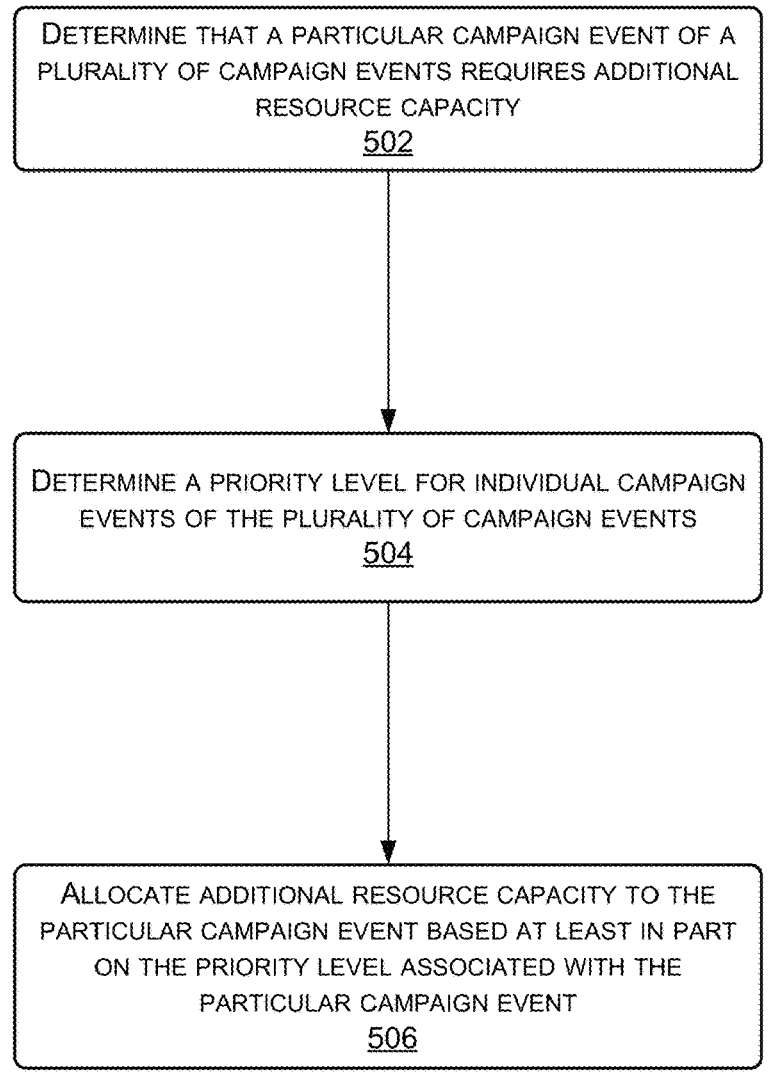
FIG. 5 illustrates a flow diagram of a process that monitors multiple campaign events, and dynamically re-allocate resource capacity based on a determined priority of individual campaign events and a utilization of the allotted resource capacity.

FIG. 5 illustrates a flow diagram of a process that monitors multiple campaign events, and dynamically re-allocate resource capacity based on a determined priority associated with individual campaign events and a utilization of the allotted resource capacity. In various examples, a general pool of resource capacity may be allocated to one or more campaign events that are be executed simultaneously, or near-simultaneously. Consequently, the general pool of resource capacity may be required to provide resource capacity to a plurality of campaign events at the same time. Thus, an allocation of resource capacity for individual campaign events may be at least partly based on a determined priority associated with each individual campaign event.

At 502, the campaign management system determines that a particular campaign event of a plurality of campaign events requires additional resource capacity. In some examples, additional resource capacity may be required to ensure that the number of notifications associated with the campaign event are delivered within a specific time frame. In a non-limiting example, a campaign event may solicit consumer responses, and the initial allocation of resource capacity may be partly based on an expectation of consumer responses that follow the initial notification. Therefore, in event that the consumer response rate exceeds expectations, the particular campaign event may require additional resource capacity to transmit follow-up notifications.

At 504, the campaign management system determines a priority score for individual campaign events of the plurality of campaign events. In various examples, a priority score may be used to prioritize an allocation of resource capacity to a particular campaign event, or group of campaign events, based on criteria such as an importance of notifications to the consumer or sender. For example, a billing campaign event may be assigned a higher priority score than a marketing campaign event, because the information associated with billing notifications may be valued higher, by the consumer or sender, ahead of marketing notifications. A priority score may also be based on an SLA associated with the campaign event. For example, an SLA that defines a minimum allocation of resource capacity may be assigned a higher priority score in comparison to another campaign event that is not subject to an SLA.

Further, a priority score may also determine whether an initial allocation of resource capacity for a campaign event is throttled back. In a non-limiting example, a campaign event, or group of campaign events, with a low priority score may have an initial allocation of resource capacity throttled back, that is reduced, in the event that the resource capacity needs to be re-allocated to another campaign event, or group of campaign events, with a higher priority score.

At 506, the campaign management system may allocate additional resource capacity to the particular campaign event based at least in part on the priority score associated with the particular campaign event. In a non-limiting example, a campaign event, or a group of campaign events, with a high priority score may receive an allocation of additional resource capacity ahead of another campaign event, or group of campaign events, that also require an allocation of additional resource capacity, but have assigned, a lower priority score.

Figure 6:
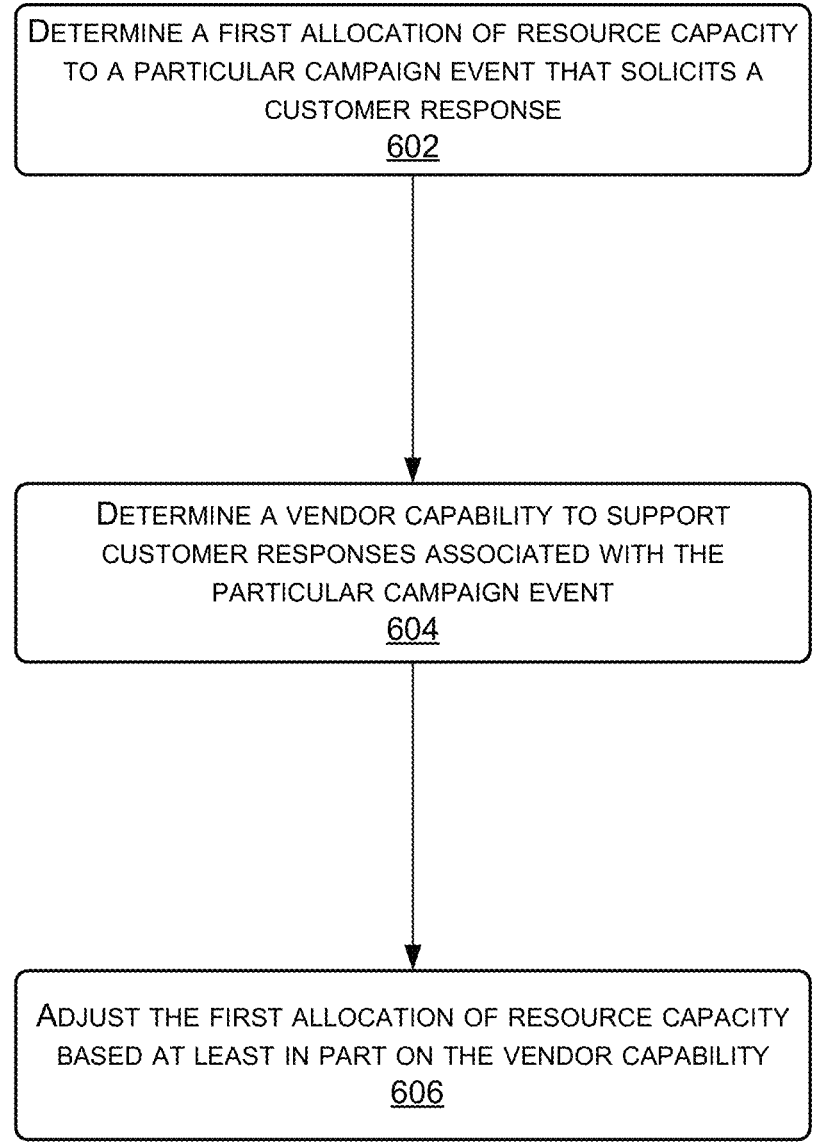
FIG. 6 illustrates a flow diagram of a process that throttles-back resource capacity for a particular campaign event based on a determined vendor capability to support customer responses associated with the particular campaign event.

FIG. 6 illustrates a flow diagram of a process that throttles-back resource capacity for a particular campaign event based on a determined vendor capability to support customer responses associated with the particular campaign event. In various examples, the campaign management system may throttle-back, in other words reduce, an allocation of resource capacity assigned to a particular campaign event, or a group of campaign events. An allocation of resource capacity may be throttled back in response to determining that a vendor's call-back volume capabilities are unable to service a response rate associated with a particular campaign event, or a group of campaign events. Further, an allocation of resource capability for a particular campaign event, or a group of campaign events, may be throttled back so that at least a portion of the resource capacity can be re-assigned to another campaign event, or group of campaign events, that have assigned a higher priority score.

At 602, the campaign management system may determine a first allocation of resource capacity to a particular campaign event that solicits a customer response. The first allocation of resource capacity may be based at least in part on historical trends, an expectation of demand, or an SLA. In a non-limiting example, an SLA may define a minimum allocation of resource capacity for a campaign event, or a group of campaign events.

At 604, the campaign management system may determine a vendor capability to support the customer responses associated with the particular campaign event. In a non-limiting example, the resource capacity may be measured as a number of notifications sent to consumers per second. A particular campaign event may solicit consumer responses that historically result in a particular percentage of expected call-backs. Therefore, if the number of call-backs expected, based on the allocated resource capacity and the particular percentage of expected call-backs, exceeds a call-back volume capability of the vendor, then the resource capacity may be throttled back such that the vendor's capabilities are not exceeded. In some examples, an alert may be sent to a campaign manager indicating that the resource capacity associated with the particular campaign event, or group of campaign events, is being throttled-back based on a call-back volume capability of the vendor. Thus, the campaign manager may be able to modify, via a user interface of the campaign management system, the capabilities of the vendor, if they do not adequately reflect present vendor capabilities.

At 606, the campaign management system may adjust the first allocation of resource capacity based at least in part on the vendor capability. In various examples, the first allocation of resource capacity may be adjusted by re-allocating a portion of the first allocation of resource capacity to the general resource capacity pool, a reserve pool, or to another campaign event, or group of campaign events, that require additional resource capacity.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:

1. A method of allocating campaign resources, comprising:
   receiving, by a campaign management system, at least one campaign event specifying delivery of at least a first notification to a plurality of client devices, the first notification being a message that solicits a response from individual client devices of the plurality of client devices;
   allocating, by the campaign management system from a resource capacity pool associated with computing resources of the campaign management system, a resource capacity for an execution of the at least one campaign event by the campaign management system;
   sending, by the campaign management system, the first notification to the plurality of client devices using the resource capacity;
   receiving, by the campaign management system from at least one client device of the plurality of client devices, the response associated with the at least one campaign event;
   sending, by the campaign management system, a second notification to the at least one client device using the resource capacity based at least in part on receiving the response;
   monitoring, by the campaign management system, a utilization level of the resource capacity, the utilization level being based at least in part on sending the first notification to the plurality of client devices and sending the second notification to the at least one client device; and
   adjusting, in real-time by the campaign management system, an amount of the resource capacity based at least in part on the utilization level.

2. The method of claim 1, further comprising:
   determining, by the campaign management system, a response rate reflecting how many of the plurality of client devices to which the first notification has already been sent have sent responses to the first notification;
   determining, by the campaign management system, that the response rate is higher than expected response rate;
   determining, by the campaign management system, an amount of additional resource capacity beyond the resource capacity that would be required to send the second notification to individual ones of the plurality of client devices that send responses to the first notification;
   determining, by the campaign management system, that the amount of additional resource capacity is unavailable to the campaign management system; and
   reducing, by the campaign management system, a number of client devices of the plurality of client devices to which the first notification is still to be sent.

3. The method of claim 1, wherein the resource capacity corresponds to a predetermined number of notifications that are to be sent per second to the plurality of client devices.

4. The method of claim 1, wherein the first notification and the second notification are short message service (SMS) notifications sent to a short message service center for transmission to individual ones of the plurality of client devices.

5. The method of claim 1, further comprising presenting, by a user interface of the campaign management system, an alert indicating that additional resource capacity is needed for the at least one campaign event based on the utilization level.

6. The method of claim 1, wherein the resource capacity pool includes a general pool of resource capacity and a reserve pool of resource capacity, and wherein the adjusting comprises reallocating computing resources from the reserve pool to the resource capacity.

7. The method of claim 1, wherein the allocating is performed based on a historical trend of response rates or an expected response rate.

8. One or more non-transitory computer-readable media storing computer-executable instructions that, when executed on one or more processors, performs acts comprising:
   receiving at least one campaign event specifying delivery of at least a first notification to a plurality of client devices, the first notification being a message that solicits a response from individual client devices of the plurality of client devices;

allocating, from a resource capacity pool associated with computing resources of a server, a resource capacity for an execution of the at least one campaign event by the server;

sending the first notification to the plurality of client devices using the resource capacity allocated on the server;

receiving, from at least one client device of the plurality of client devices, the response associated with the at least one campaign event;

sending a second notification to the at least one client device using the resource capacity based at least in part on receiving the response;

monitoring a utilization level of the resource capacity, the utilization level being based at least on in part on sending the first notification to the plurality of client devices and sending the second notification to the at least one client device; and adjusting, in real-time, an amount of the resource capacity based at least in part on the utilization level.

9. The one or more non-transitory computer-readable media of claim 8, wherein the acts further comprise:

determining a response rate reflecting how many of the plurality of client devices to which the first notification has already been sent have sent responses to the first notification;

determining that the response rate is higher than an expected response rate;

determining an amount of additional resource capacity beyond the resource capacity that would be required to send the second notification to individual ones of the plurality of client devices that send responses to the first notification;

determining that the amount of additional resource capacity is unavailable on the server; and reducing a number of client devices of the plurality of client devices to which the first notification is still to be sent.

10. The one or more non-transitory computer-readable media of claim 8, wherein the resource capacity corresponds to a predetermined number of notifications that are to be sent per second to the plurality of client devices.

11. The one or more non-transitory computer-readable media of claim 8, wherein the first notification and the second notification are short message service (SMS) notifications sent to a short message service center for transmission to individual ones of the plurality of client devices.

12. The one or more non-transitory computer-readable media of claim 8, wherein the acts further comprise presenting, via a user interface, an alert indicating that additional resource capacity is needed for the at least one campaign event based on the utilization level.

13. The one or more non-transitory computer-readable media of claim 8, wherein the server includes a general pool of resource capacity and a reserve pool of resource capacity, and wherein the adjusting comprises reallocating computing resources from the reserve pool to the resource capacity.

14. The one or more non-transitory computer-readable media of claim 8, wherein the allocating is performed based on a historical trend of response rates or an expected response rate.

15. A server, comprising:
one or more processors;
a resource capacity pool associated with computing resources of the server; and
memory storing computer-executable instructions that, when executed by the one or more processors, cause the server to perform operations comprising:
receiving at least one campaign event specifying delivery of at least a first notification to a plurality of client devices, the first notification being a message that solicits a response from individual client devices of the plurality of client devices;
allocating, from the resource capacity pool, a resource capacity for an execution of the at least one campaign event by the server;
sending the first notification to the plurality of client devices using the resource capacity;
receiving, from at least one client device of the plurality of client devices, the response associated with the at least one campaign event;
sending a second notification to the at least one client device using the resource capacity based at least in part on receiving the response;
monitoring a utilization level of the resource capacity, the utilization level being based at least in part on sending the first notification to the plurality of client devices and sending the second notification to the at least one client device; and
adjusting, in real-time, an amount of the resource capacity based at least in part on the utilization level.

16. The server of claim 15, wherein the operations further comprise:
determining a response rate reflecting how many of the plurality of client devices to which the first notification has already been sent have sent responses to the first notification;
determining that the response rate is higher than an expected response rate;
determining an amount of additional resource capacity beyond the resource capacity that would be required to send the second notification to individual ones of the plurality of client devices that send responses to the first notification;
determining that the amount of additional resource capacity is unavailable on the server; and
reducing a number of client devices of the plurality of client devices to which the first notification is still to be sent.

17. The server of claim 15, wherein the resource capacity corresponds to a predetermined number of notifications that are to be sent per second to the plurality of client devices.

18. The server of claim 15, wherein the operations further comprise presenting, via a user interface, an alert indicating that additional resource capacity is needed for the at least one campaign event based on the utilization level.

19. The server of claim 15, wherein the server includes a general pool of resource capacity and a reserve pool of resource capacity, and wherein the adjusting comprises reallocating computing resources from the reserve pool to the resource capacity.

20. The server of claim 15, wherein the allocating is performed based on a historical trend of response rates or an expected response rate.

* * * * *